(12) United States Patent
Tubbesing

(10) Patent No.: US 12,008,518 B2
(45) Date of Patent: Jun. 11, 2024

(54) SYSTEM AND METHOD OF MANAGING A SELF-STORAGE FACILITY THAT MINIMIZES OPERATOR-CUSTOMER CONTACT

(71) Applicant: Fujin Beteiligungsgesellschaft mbH, Putzbrunn (DE)

(72) Inventor: Roland Tubbesing, Munich (DE)

(73) Assignee: Fujin Beteiligungsgesellschaft mbH, Putzbrunn (DE)

( * ) Notice: Subject to any disclaimer, the term of this patent is extended or adjusted under 35 U.S.C. 154(b) by 8 days.

(21) Appl. No.: 17/554,460

(22) Filed: Dec. 17, 2021

(65) Prior Publication Data

US 2023/0196279 A1  Jun. 22, 2023

(51) Int. Cl.
G06Q 10/087 (2023.01)
B65G 1/137 (2006.01)
G06F 3/06 (2006.01)

(52) U.S. Cl.
CPC ......... G06Q 10/087 (2013.01); G06F 3/0604 (2013.01); B65G 1/1371 (2013.01)

(58) Field of Classification Search
None
See application file for complete search history.

(56) References Cited

U.S. PATENT DOCUMENTS

| | | | | |
|---|---|---|---|---|
| 8,571,901 | B2 * | 10/2013 | Shoen | G06Q 10/0875 705/5 |
| 2008/0106368 | A1 * | 5/2008 | Vitier | E04H 3/06 340/5.5 |
| 2020/0005390 | A1 * | 1/2020 | Minsley | E05B 65/48 |
| 2021/0034882 | A1 * | 2/2021 | Johnson | G07C 9/00309 |
| 2023/0056890 | A1 * | 2/2023 | Pasma | G07C 9/23 |

* cited by examiner

Primary Examiner — Kristy A Haupt
(74) Attorney, Agent, or Firm — von Briesen & Roper, s.c.

(57) ABSTRACT

A system and method for managing a self-storage facility of the type operated and managed so that customers leasing a self-storage compartment can specify their data on site or online.

16 Claims, 2 Drawing Sheets

SYSTEM AND METHOD OF MANAGING A SELF-STORAGE FACILITY THAT MINIMIZES OPERATOR-CUSTOMER CONTACT

BACKGROUND OF THE INVENTION

Field of the Invention

This invention relates to a method of managing a self-storage facility of the type operated and managed so that customers leasing a self-storage compartment can specify their data on site or online.

Description of the Related Art

Known self-storage facilities are operated and managed so that customers leasing a self-storage compartment specify their data such as names, addresses, payment method, term of lease, number and/or size of the self-storage compartment, etc. on site or online (web site).

The customer will then receive a shackle or plug-in lock to lock the allocated self-storage compartment in the self-storage facility potentially comprising hundreds of self-storage compartments with a door to which the lock is attached.

In the course of the Covid-19 pandemic, it turned out that personal contacts between the customers and the operator of the self-storage facility or his/her employees should be minimized. In order to render a (complete) automation of the processes and the management in a self-storage facility, the leasing, the access control to the self-storage facility and the rented self-storage compartment, the invoicing (as well as other advantageous functions possible) various technical innovations and interventions into the processes or the management of the self-storage facility are required.

The present disclosure addresses these requirements.

BRIEF SUMMARY OF THE INVENTION

The present disclosure relates to a system and method for an automated method of managing a self-storage facility so that customers leasing a self-storage compartment can specify their data on site or online.

In one aspect, the disclosure relates to a method of managing a self-storage facility. The method may comprise the steps of inputting into a customer database 122 a customer's data, the customer's data comprising a customer name, a customer address, a payment method, a term of lease, a size of the self-storage compartment and a number of the self-storage compartments; allocating to the customer a self-storage compartment in the self-storage facility, the self-storage compartment having an interior and secured with one or more individual compartments and a door having an electronic lock; providing the customer with means for unlocking the electronic lock, said means comprising a software application downloaded to a customer's mobile device; registering the mobile device so that it has functional access to electronic lock; and generating a customer code via a server after the registering step, thereby enabling the customer to remotely lock and unlock the electronic lock and gain access to the self-storage compartment.

The method may comprise the additional step of deploying one or more sensors inside the self-storage facility and/or in the self-storage compartment, each sensor capable of detecting one or more parameters of the surroundings within the self-storage facility and/or in the interior of each of the one or more self-storage compartments; and transmitting the one or more parameters to the server via electric connections or wireless via WLAN or Wi-Fi.

The one or more sensors may include a temperature sensor for sensing a temperature of the interior of the self-storage compartment, an air humidity sensor for sensing a humidity of the interior of the self-storage compartment, a water detector, a motion sensor, a camera, face recognition software, an acoustic sensor, a gas detector and an infrared sensor for identifying persons potentially present and moving in the self-storage facility with or without illumination.

In another aspect the disclosure relates to a system for managing a self-storage facility. The system may comprise one or more self-storage compartments located within the self-storage facility, each self-storage compartment having an interior and secured with a door equipped with an electronic lock; one or more sensors located inside the self-storage facility and/or in the self-storage compartment, each sensor capable of detecting one or more parameters of the surroundings within the self-storage facility and/or within the interior of each self-storage compartment; a central server for collecting data and controlling and managing corresponding functions and processes with the aid of algorithms; a database residing on the central server and comprising for each customer a customer name, a customer address, a payment method, a term of lease, a size of the self-storage compartment and a number of the self-storage compartments leased to that customer; and a software application downloaded to each customer's mobile device so that the customer has functional access to each electronic lock of the self-storage compartments leased to that customer, thereby enabling the customer to remotely lock and unlock the electronic lock and gain access to the self-storage compartment.

DETAILED DESCRIPTION OF THE INVENTION

Figure 1:
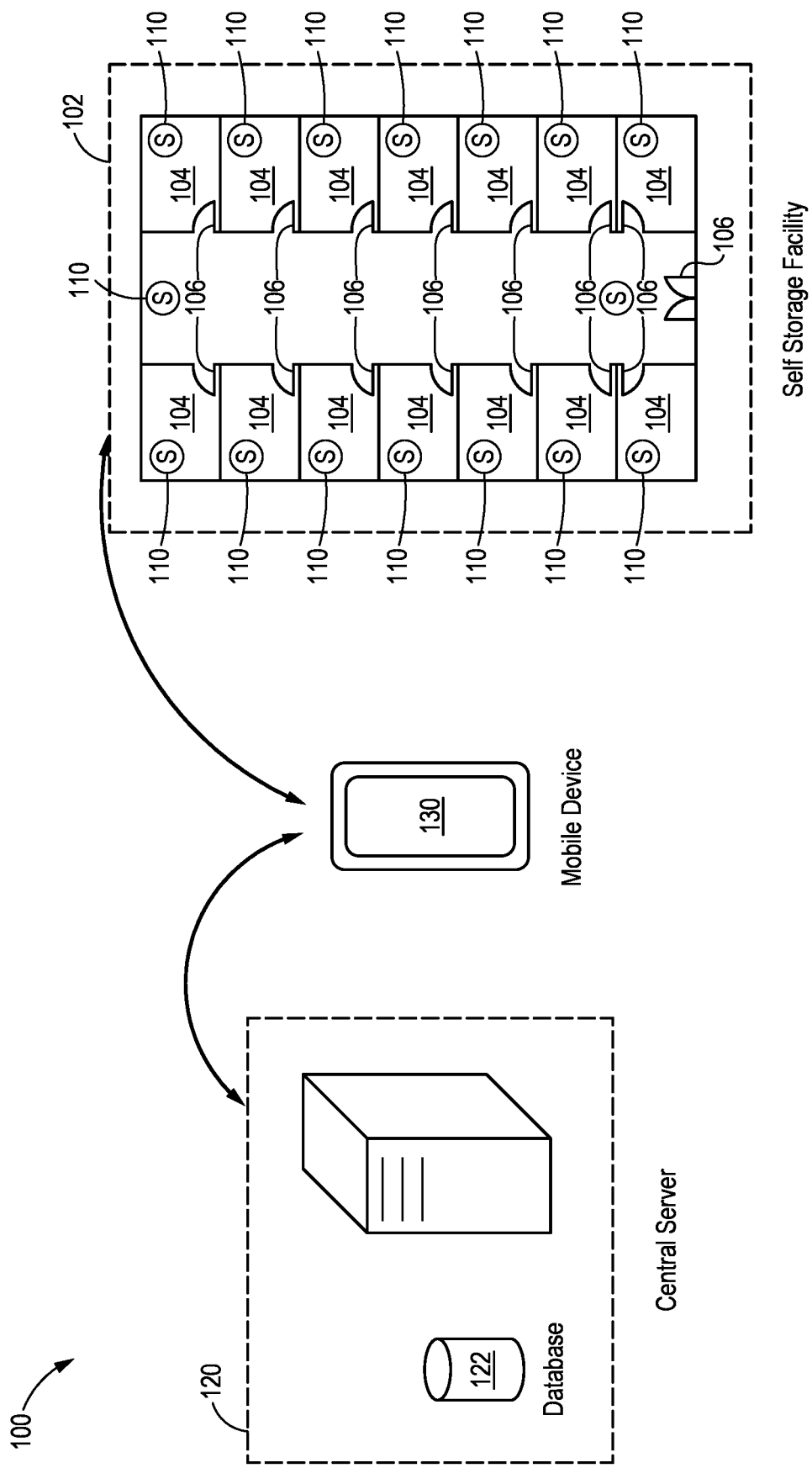
FIG. 1 is a block diagram of an exemplary system for managing a self-storage facility according to the disclosure.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Known self-storage facilities are operated and managed so that customers leasing a self-storage compartment specify their data such as names, addresses, payment method, term of lease, number and/or size of the self-storage compartment, etc. on site or online (web site).

The customer will then receive a shackle or plug-in lock to lock the allocated self-storage compartment in the self-storage facility potentially comprising hundreds of self-storage compartments with a door to which the lock is attached.

In the course of the Covid-19 pandemic, it turned out that personal contacts between the customers and the operator of the self-storage facility or his/her employees should be minimized. In order to render a (complete) automation of the processes and the management in a self-storage facility, the leasing, the access control to the self-storage facility and the rented self-storage compartment, the invoicing (as well as other advantageous functions possible) various technical innovations and interventions into the processes or the management of the self-storage facility are required.

Electronic Locks

In a first innovation, a method 200 of managing a self-storage facility 102 involves the use of electronic locks to be deployed instead of the conventional mechanical shackle or plug-in locks. These electronic locks are preferably unlocked and locked via a leaser's smartphone. To this end, a code generated by the operator of the self-storage facility 102 via a server 120 after the registration by a customer has to be transferred to the customer's/leaser's smartphone. Server 120 may refer to an on-site server or an off-site server, such as a cloud server.

The customer can then unlock the doors 106 to the self-storage facility 102, enter it, and go to the leased self-storage compartment 104 and unlock the door 106 of the self-storage compartment 104 there to store or collect things/items at any time using this code.

Sensors

A second innovation relates to the deployment of various sensors 110 inside the self-storage facility 102 and in or on each self-storage compartment 104. To this end, a box or housing in which there is space for several sensors 110 which detect corresponding parameters of the surroundings both on the compartment side and on the (access) corridor side and transmit them to the above-mentioned server 120 via electric connections or wireless via WLAN or Wi-Fi is mounted on the wall of each self-storage compartment 104.

In this (sensor) housing, also illuminating means may be provided which may illuminate and light both the corridor to the self-storage compartment 104 and the interior of the self-storage compartment 104. The control of these illuminating means is part of the novel management of the self-storage facility 102.

Exemplarily, the following sensors 110 may be deployed and determine the scope of the functionality available to the operator of the self-storage facility 102 for management:
Temperature sensor: temperature warning for both the interior of each self-storage compartment 104 and for the (access) corridor outside of it; temperature control for sensible stored goods such as, for example, wine.
Air humidity sensor: detection of water damage; humidity control for sensible stored goods such as tobacco products or wine.
Motion sensor: intrusion protection; detection of, e.g., moths.
Camera: vermin detection; monitoring of the self-storage facility 102 and the compartments; face recognition.
Acoustic sensor: vermin detection, for example of rodents; language recognition.
Gas detector: identification of hazardous (explosive/prohibited) substances.

Further electronic means which may be provided in the sensor housing are, for example, infrared sensors 110 identifying customers potentially present and moving in the self-storage facility 102 or compartment even without illumination. The infrared sensor 110 may be used to identify people (e.g. a burglar) in a part of the facility or in a compartment without having the correct PIN for access to such a location within the self-storage facility 102.

The server 120 of the self-storage facility 102 may, in this case, be provided on-site, or off-site as a cloud server. It is important that all detected data are available to the server 120 and that specific functions are made available to the operator of the self-storage facility 102 and to the customers of the leased self-storage compartments 104 by way of corresponding algorithms there.

Depending on the desired scope of functions, these sensors, other electronic means, and algorithms are provided to the operator of the self-storage facility 102.

INDUSTRIAL APPLICABILITY

For the operator of the self-storage facility 102, significant advantages arise.

Cost reduction owing to reduced staff. Staff means employees or external suppliers like cleaning staff, security contractor, rodent control and removal services etc.

Customer instant access 24/7 to the self-storage facility 102, even with a booking right outside the facility and online.

Improved service for the customers and thus distinction from the competitors in the market.

Protection of the self-storage facility 102 or estate.

Up-selling potential for the operator towards the customers by offering functions which competitors cannot offer.

Early identification of terminations (churn prevention) of a self-storage compartment 104 for the operator.

For the first time, a customer guidance system operating as follows can be realized by the novel management of the self-storage facility 102 described here.

Since the self-storage facility 102 is provided with the sensor housings on the self-storage compartments 104 and, for example, cameras are integrated there which detect movements within the self-storage facility 102 and transmit them to the server 120 the customer can be positively identified by means of the access control to the self-storage facility 102 and guided to his/her leased self-storage compartment 104 from the entrance of the self-storage-facility by a corresponding control of the illuminating means in the sensor housings on the corridor side by turning the illumination on and off so that the customer recognizes in which direction he/she is to go with the aid of the light. When the customer reaches the leased self-storage compartment 104 the electronic lock of the door of the self-storage compartment 104 may be unlocked, for example by means of a smartphone or by voice recognition. Further comfort functions may be that the customer asks for the way to the rest room or the exit, and the server 120, by way of speech recognition via a microphone in the sensor housing, shows the customer the way to the rest room or the exit of the self-storage facility 102 by means of the illuminating means which is then correspondingly turned on and off again after having been passed by the customer.

Based on the detected sensor data, a customer churn prevention management can be performed through corresponding algorithms: among other things, for how long the customer is in the self-storage facility 102 and in the self-storage compartment 104; how often the customer enters the self-storage facility 102; at what times the customer enters and leaves the self-storage facility 102; whether the customer applies for a change of the PINs of the access control; how often the customer enters and leaves the self-storage facility 102 within a specific period of time are detected by the various sensors.

If, based on these data, it is identified that a customer might intend to terminate a self-storage compartment 104, the novel management system 100 proposed here can take counter measures and, for example, offer a price reduction for the lease due to an existing long-term lease to the customer or offer additional functions for the self-storage compartment 104 without demanding an extra charge. Such a function might, for example, be to allow the customer online access so that he/she can see the interior of the leased self-storage compartment 104 via a camera and/or parameters such as the temperature and/or air humidity in the self-storage compartment 104. Particularly in case of sensible goods stored in the self-storage compartment 104 by the customer these functions can be useful to the customer so that the customer will no longer pursue the intended termination.

In some cases, the operator of a self-storage facility 102 might want specific customers to cancel the lease, e.g. because the customer is "unwanted", i.e. does not pay the lease fee in time and/or contravenes some of the rules (for example keep it clean) for renting the self-storage compartment 104. The same data used for the churn prevention management may be used to identify such customers.

The vermin detection as a new management tool for operating a self-storage facility 102 can be implemented through motion detection (rodents, moths, other insects, . . . ) by a camera or via a microphone as an acoustic sensor. After the detection of vermin, an insect can be detected and eliminated by means of additional electronic means such as, for example, a laser. Larger vermin can be localized and, if required, removed manually.

Another functionality of the management system 100 is that, in case of failure to pay for the leased self-storage compartment 104, the customer is no longer allowed access to the self-storage facility 102. The server 120 receives all data associated with the lease and can keep the locks of the self-storage facility 102 and the leased self-storage compartment 104 locked in case of a failure to pay.

The System 100

FIG. 1 is a block diagram of an exemplary system for managing a self-storage facility according to the disclosure. The novel system 100 for the management of a self-storage facility 102 may consist of the following components:

self-storage compartment 104s which are provided with a sensor housing, respectively, which comprises various sensors 110 and other electronic means which are, depending on the configuration level (scope of functionalities), arranged on the corridor side and/or on the compartment side;

a server 120 which collects all data and controls and manages corresponding functions and processes with the aid of algorithms; said data including the customer data upon lease of a self-storage compartment 104 as well as all data detected by the sensors 110 in the self-storage facility 102; and electronic locks on the entrances of the self-storage facility 102 and on each door of each self-storage compartment 104 as well as, where appropriate, on intermediate doors within the self-storage facility 102.

As another example of the specific functionality of this novel management, it is proposed that, when two customers enter the self-storage facility 102 at almost the same time, they are guided to their respectively leased self-storage compartment 104 via separate ways or corridors by the customer guidance system described above (guidance by turning the corridor illumination on and off) so that the contact between these two customers inside the building is minimized even if these two self-storage compartments 104 are closely adjacent to each other.

Finally, for example, also screens which convey information to the customers and are controlled by the server 120 via the sensor housing by means of an electric connection or wireless via Wi-Fi or Bluetooth can be attached to each self-storage compartment 104.

Potential configuration levels/functionalities:
Only motion detectors/detection
Plus hazard early warning system
Plus churn prevention
Plus customer guidance system
Plus vermin detection/elimination The Method 200

Figure 2:
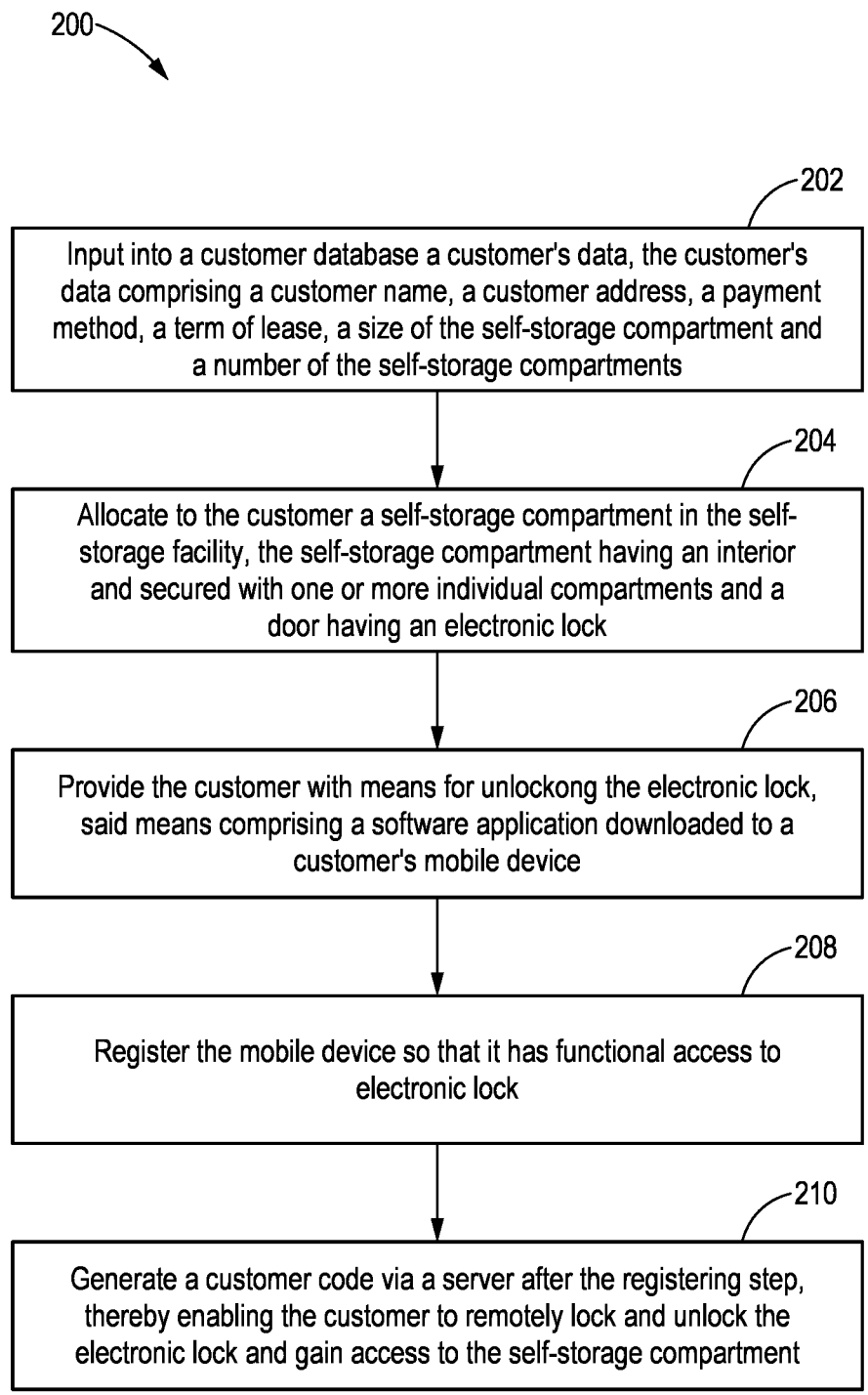
FIG. 2 is a schematic diagram showing a method of managing a self-storage facility according to the disclosure.

FIG. 2 is a schematic diagram showing a method of managing a self-storage facility according to the disclosure. The novel method 200 of managing a self-storage facility may comprise the following steps:

Step 202: inputting into a customer database 122 a customer's data, the customer's data comprising a customer name, a customer address, a payment method, a term of lease, a size of the self-storage compartment and a number of the self-storage compartments;

Step 204: allocating to the customer a self-storage compartment in the self-storage facility, the self-storage compartment having an interior and secured with a door having an electronic lock;

Step 206: providing the customer with means for unlocking the electronic lock, said means comprising a software application downloaded to a customer's mobile device;

Step 208: registering the mobile device so that it has functional access to electronic lock; and Step 210: generating a customer code via a server after the registering step, thereby enabling the customer to remotely lock and unlock the electronic lock and gain access to the self-storage compartment.

The method 200 may comprise the additional step of deploying one or more sensors inside the self-storage facility and/or in the self-storage compartment, each sensor capable of detecting one or more parameters of the surroundings within the self-storage facility and/or in the interior of each of the one or more self-storage compartments; and transmitting the one or more parameters to the server via electric connections or wireless via WLAN or Wi-Fi.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. A method of managing a self-storage facility comprising one or more self-storage compartments, the method comprising the steps of:

inputting into a customer database a customer's data, the customer's data comprising a customer name, a customer address, a payment method, a term of lease, a size of the self-storage compartment and a number of the self-storage compartments;

allocating to the customer a self-storage compartment in the self-storage facility, the self-storage compartment having an interior and secured with a door having an electronic lock;

providing the customer with means for unlocking the electronic lock, said means comprising a software application downloaded to a customer's mobile device;

registering the mobile device so that it has functional access to one of the electronic locks; and generating a customer code via a server after the registering step, thereby enabling the customer to remotely lock and unlock the electronic lock and gain access to the self-storage compartment.

2. The method of claim 1 comprising the additional step of:
deploying one or more sensors inside the self-storage facility and/or in the self-storage compartment, each sensor capable of detecting one or more parameters of the surroundings within the self-storage facility and/or in the interior of each of the one or more self-storage compartments; and
transmitting the one or more parameters to the server via electric connections or wireless via WLAN or Wi-Fi.

3. The method of claim 2 wherein the one or more sensors include:
a temperature sensor for sensing a temperature of the interior of the self-storage compartment.

4. The method of claim 2 wherein the one or more sensors include:
an air humidity sensor for sensing a humidity of the interior of the self-storage compartment.

5. The method of claim 2 wherein the one or more sensors include:
a water detector for sensing the presence of water within the interior of the self-storage compartment.

6. The method of claim 2 wherein the one or more sensors include:
a motion sensor.

7. The method of claim 2 wherein the one or more sensors include:
a camera.

8. The method of claim 2 wherein the one or more sensors include:
face recognition software.

9. The method of claim 2 wherein the one or more sensors include:
an acoustic sensor.

10. The method of claim 2 wherein the one or more sensors include:
a gas detector.

11. The method of claim 2 wherein the one or more sensors include:
an infrared sensor for identifying persons potentially present and moving in the self-storage facility with or without illumination.

12. The method of claim 2 wherein:
the server is either cloud based or located on-site;
all information and data obtained via the sensors is available to the server and accessible by both an operator of the self-storage facility and to the customer.

13. The method of claim 1 comprising the additional step of:
providing lighting means to illuminate the area outside the self-storage compartment and/or the interior of the self-storage compartment, the lighting capable of being controlled by the user's mobile device.

14. A system for managing a self-storage facility comprising:
one or more self-storage compartments located within the self-storage facility, each self-storage compartment having an interior and secured with a door equipped with an electronic lock;
one or more sensors located inside the self-storage facility and/or in the self-storage compartment, each sensor capable of detecting one or more parameters of the surroundings within the self-storage facility and/or within the interior of each self-storage compartment;
a central server for collecting data and controlling and managing corresponding functions and processes with the aid of algorithms;
a database residing on the central server and comprising for each customer a customer name, a customer address, a payment method, a term of lease, a size of the self-storage compartment and a number of the self-storage compartments leased to that customer; and
a software application downloaded to each customer's mobile device so that the customer has functional access to each electronic lock of the self-storage compartments leased to that customer, thereby enabling the customer to remotely lock and unlock the electronic lock and gain access to the self-storage compartment.

15. The system of claim 14, wherein:
the central server is cloud-based.

16. The system of claim 14 in which the central server is configured to automatically disable unlocking of the self-storage compartment by a customer code when a payment for the self-storage compartment is not received.

* * * * *